Figure 1:
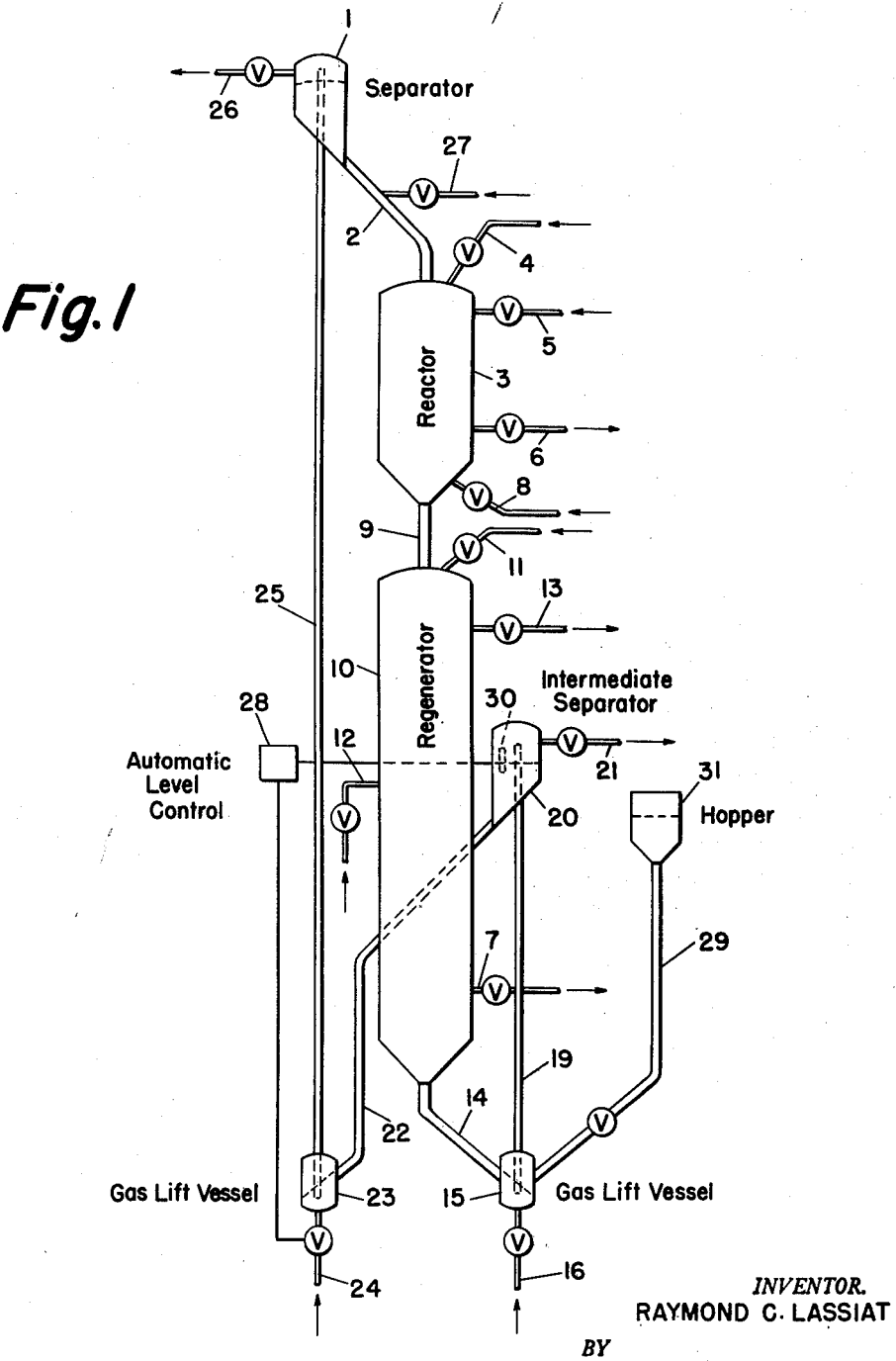

March 30, 1954     R. C. LASSIAT     2,673,832
ELEVATION OF SUBDIVIDED SOLIDS
Filed Nov. 1, 1949     2 Sheets-Sheet 1

INVENTOR.
RAYMOND C. LASSIAT
BY
ATTORNEYS

Patented Mar. 30, 1954

2,673,832

UNITED STATES PATENT OFFICE 2,673,832

ELEVATION OF SUBDIVIDED SOLIDS

Raymond C. Lassiat, Swarthmore, Pa., assignor to Sun Oil Company, Philadelphia, Pa., a corporation of New Jersey Application November 1, 1949, Serial No. 124,898

14 Claims. (Cl. 196—52)

This invention relates to method and apparatus for transporting subdivided solids from a lower zone to a higher zone. More particularly, it relates to method and apparatus for transporting subdivided solids from one stage of a system through which such solids are circulated to another, relatively more elevated, stage of that system by means of a transporting gas.

The invention may advantageously be used in cases where the subdivided solids are catalytic materials such as are used in catalytic cracking and other catalytic conversions of hydrocarbon oil, for example hydrogenation, dehydrogenation, aromatization, polymerization, isomerization, reforming, alkylation, or desulfurizing; it may also be advantageously used in cases where the subdivided solids are heated inert solids such as are used in thermal cracking, viscosity breaking, and coking of hydrocarbon oils, or where they are adsorbent solids adapted to remove by adsorption certain constituents of a mixture of gasiform materials.

It is known in the art to transport subdivided catalyst from one zone in a continuous moving bed conversion process to a second, relatively more elevated, zone by means of a transporting gas. For example, systems have been disclosed wherein conversion catalyst flows by gravity as a compact mass through a conversion vessel under elevated pressure, then to a regeneration vessel under pressure not substantially greater than the conversion vessel pressure, then through the regeneration vessel into solids conduit, or seal leg, extending downwardly from the bottom of the regeneration vessel, and is carried upwardly by a transporting gas from the bottom of the seal leg through a gas-solids conduit to a gas-solids separating vessel above the conversion vessel.

In the type of operation above described, it is necessary, because of the pressure drop in the gas-solids conduit, to supply transporting gas to the gas-solids conduit at a pressure which is substantially greater than the pressure at the catalyst outlet of the regenerator. Therefore, there is a tendency for transporting gas to flow upwardly through the seal leg extending down from the regenerator.

When subdivided solids move downwardly by gravity as a compact mass through a confined space such as the seal leg described above, and a gas flows through that confined space countercurrent to the solids, the velocity of the solids is a function of the pressure drop undergone by the gas as it flows through the confined space: the greater the gaseous pressure drop, the less the solids velocity. Therefore, with a given size and nature of solids and with a confined space of given constant cross section, there is, for each ratio of the actual solids velocity to the solids velocity which would prevail in the absence of gas flow through the confined space, a corresponding gaseous pressure drop per unit of vertical height of the confined space.

In designing catalytic conversion apparatus for moving compact bed operation, the above principle must be taken into account. For example, when catalyst is to move downwardly by gravity as a compact mass through a pipe whose lower terminal is at higher gaseous pressure than its upper terminal, the pipe must have sufficient vertical height that the pressure difference between its upper and lower terminals, when divided by the height of the upper terminal above the lower, gives the gaseous pressure drop, in for example 1b./sq. in. per foot, which corresponds to the catalyst velocity desired in the pipe.

Therefore, the seal leg in the catalytic conversion system above described must have sufficient vertical height to balance the excess in pressure of the transporting gas over the regenerator outlet pressure; otherwise the flow of transporting gas upwardly through the seal leg will unduly retard the movement of catalyst downwardly through the seal leg.

The necessity of providing a high seal leg is a disadvantage of the type of operation disclosed above, because the heights, above the bottom of the system of apparatus, of the regenerator, the reactor, and the gas-solids separator depend directly on the height of that seal leg. Therefore, a high seal leg results in the added expense of elevating heavy equipment.

The present invention overcomes this disadvantage of the prior art by providing, in one embodiment, a multiple stage gas lift for transportation of the catalyst from the bottom of a regenerator to the top of a reactor. In this way, there is added to the system at least one additional seal leg which, though it aids materially in balancing the gaseous pressures in the system, is not connected to either the reactor or the regenerator, and therefore does not affect the required height of either. As subsequently shown in the examples, the presence of the additional seal leg makes it possible to decrease the required height of that other seal leg which extends downwardly from the regenerator, and therefore to decrease the necessary height, above the bottom of the system, of the regenerator, and of the reactor if the latter is situated directly above the regenerator. It is noted that the invention is also applicable to systems wherein a multiple stage gas lift is used for transportation of catalyst from the bottom of a reactor to the top of a regenerator.

The invention provides generally a means for transporting subdivided solids from a lower zone to a higher zone by means of a plurality of separate gas lift units in series, each comprising a solids conduit through which subdivided solids move downwardly by gravity as a compact mass, and a gas-solids conduit through which transporting gas carries subdivided solids upwardly. Each gas lift unit other than the last in the series also comprises a gas-solids separating vessel communicating with the upper end of the gas-solids conduit. The gas-solids conduit of the last gas lift unit communicates at its upper end with the higher zone. In each gas lift unit, the gas-solids conduit communicates, adjacent the lower end thereof, with the lower end of the solids conduit. The solids conduit may discharge directly into the gas-solids conduit, but it is preferred that the solids conduit discharge into a gas lift vessel, wherein the solids settle as a compact mass around the lower end of the gas-solids conduit, which extends downwardly into the gas lift vessel; transporting gas under pressure enters the bottom of the gas lift vessel and passes through the compact mass into the gas-solids conduit and upwardly therethrough, carrying solid particles with it. The solids conduit of the first gas lift unit extends downwardly from the lower zone. The solids conduit of each of the other gas lift units extends downwardly from the separating vessel of the gas lift unit preceding it in the series. A single continuous solids path is thus formed from the lower zone to the higher zone. Transporting gas is introduced into the gas-solids conduit of each gas lift unit under elevated pressure which is higher the nearer the gas lift unit is in the solids path to the higher zone. It is generally preferred that the separating vessels be situated higher the nearer they are in the solids path to the higher zone. The separating vessels may be below the higher zone or at lower pressure than the higher zone or both, the latter being preferred; they may not be on the same level and at the same pressure as the higher zone, nor may they be substantially above the higher zone or at substantially higher pressure than the higher zone. The invention is especially applicable to systems where the lower zone is under pressure not substantially greater than the pressure in the higher zone.

This invention will be described in detail as it relates to processes for catalytic conversion of hydrocarbon oil, wherein particle-form catalyst is circulated through a system of apparatus including two reacting vessels, one a conversion vessel and the other a regeneration vessel. The catalyst moves downwardly by gravity as a compact mass through the conversion vessel and through the regeneration vessel.

Catalyst is elevated from the catalyst outlet of one reacting vessel to the catalyst inlet of the other by means of a multiple stage gas-lift as previously described in the general description of the invention, the catalyst outlet of the former reacting vessel corresponding to the lower zone, and the gas-solids separating vessel, which receives transporting gas and catalyst from the last stage of the lift and feeds separated catalyst downwardly by gravity as a compact mass to the latter reacting vessel, corresponding to the higher zone.

The reacting vessel which feeds catalyst to the multiple stage gas-lift is generally under pressure not substantially greater than the reacting vessel which receives catalyst from the multiple stage gas-lift. When the two reacting vessels are side-by-side, i. e. on substantially the same level, one vessel is usually at higher pressure than the other, and the multiple stage gas-lift elevates catalyst from the outlet of the vessel at lower pressure, usually the regenerator, to the inlet of the vessel at higher pressure. When one reacting vessel is above the other, with gravity flow of catalyst from the outlet of the vessel above to the inlet of the vessel below, the multiple stage gas lift elevates catalyst from the outlet of the vessel below, which may be either the conversion vessel or the regenerator, to the inlet of the vessel above.

The invention will be further described with reference to the attached drawings.

Figure 1 illustrates a catalytic cracking system wherein subdivided catalyst flows by gravity as a moving bed through a conversion vessel or reactor and then through a regenerator situated below the reactor, and is then transported upwardly in two stages to a separator situated above the reactor.

Figure 2:
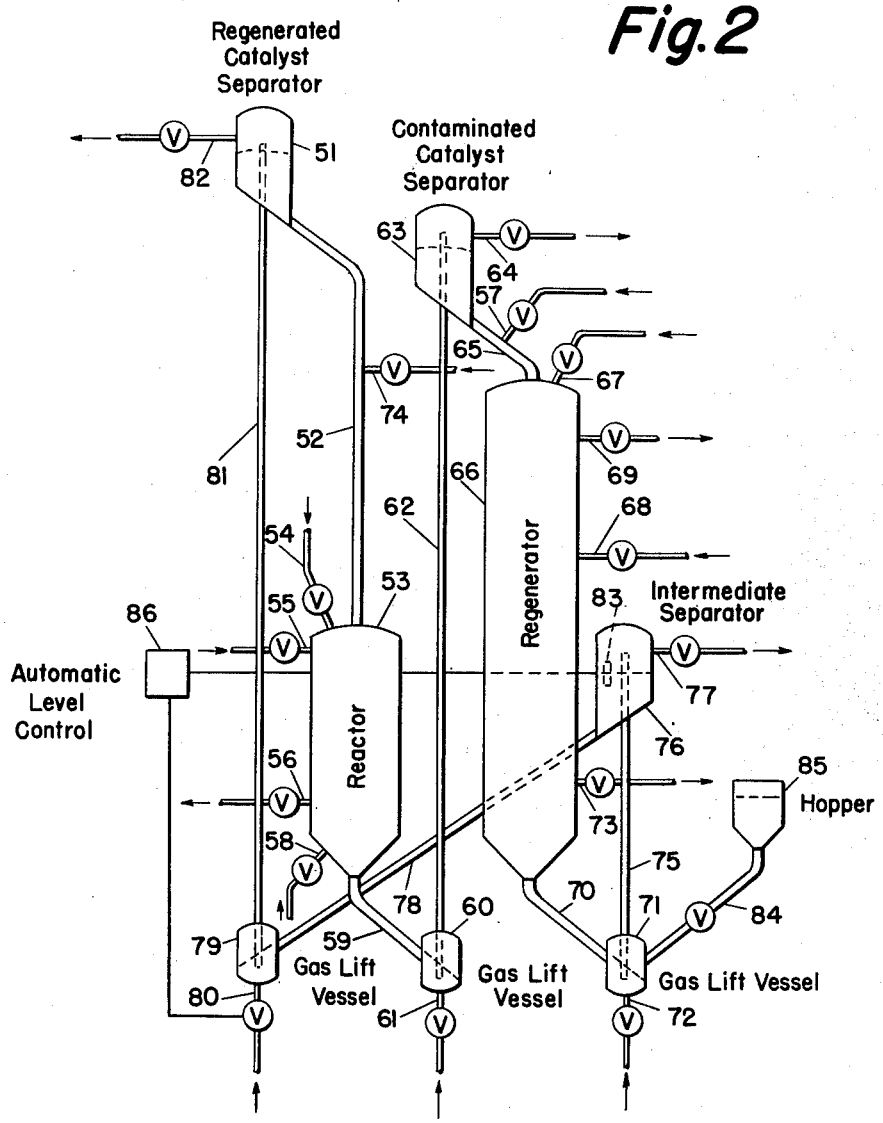

Figure 2 illustrates a catalytic cracking system wherein subdivided catalyst flows by gravity as a moving bed through a reactor and is then transported to a separator situated above a regenerator with which the reactor is situated side-by-sdie. The catalyst flows by gravity as a moving bed from the separator through the regenerator and is then transported upwardly in two stages to another separator situated above the reactor.

In these drawings, the reactors shown are of the concurrent type, but it is within the scope of the invention to use any other type, e. g. countercurrent. The regenerators shown are of the concurrent-countercurrent type wherein free-oxygen containing gas is introduced near the middle of the burning section and flows both upwardly and downwardly, flue gases being removed from the regenerator through two disengagers, one above and one below the air distributing means; but it is within the scope of the invention to use a regenerator having a plurailty of concurrent-countercurrent burning sections, or to use any other known type of regenerator.

In Figure 1 there are shown a separator 1, a reactor 3, a regenerator 10, two gas-lift vessels 15 and 23, an intermediate separator 20 between the gas-lift vessels 15 and 23, solids conduits, or seal leg lines 2, 9, and 14 connecting separator 1, reactor 3, regenerator 10, and gas-lift vessel 15 in series, a gas-solids conduit 19 connecting gas-lift vessel 15 and intermediate separator 20, a seal leg line 22 connecting intermediate separator 20 and gas-lift vessel 23, and a gas-solids conduit 25 completing the cyclic system by connecting gas-lift vessel 23 and catalyst separator 1. Also shown is an automatic level control 28, which may be of any known type, actuated by level responsive element 30 in intermediate separator 20 and responding by varying the operation of gas lift vessel 23. A hopper 31 is connected to gas lift vessel 15 by line 29.

In operation, subdivided catalyst flows by gravity as a compact mass from separator 1 through line 2 into the top of reactor 3. Steam may be introduced into line 2 through line 27. Reactor 3 is divided by suitable known means into a sealing section, a reaction section, and a purging section, through which in series the catalyst flows by gravity as a compact bed. An inert seal gas, for example steam, is introduced into the sealing section through line 4. In the reaction section, hydrocarbon oil is introduced through line 5 into any suitable distributing means and thence into the catalyst bed. The oil feed may be vapor, liquid, or mixed vapor and liquid. The oil travels downwardly in contact with the descending catalyst, with which it is contacted under cracking conditions. Cracked product vapors are disengaged from the catalyst bed by any suitable known disengaging means. The disengaged vapors leave the reactor through line 6 and are transported to conventional distillation apparatus not shown.

In the stripping section, a purge gas, for example steam, is introduced into the catalyst bed through line 8 and suitable known distributing means, passes upwardly through the catalyst and strips volatile hydrocarbons therefrom.

The catalyst, which now has deposited thereon carbonaceous contaminants, flows by gravity as a compact mass through line 9 into the top of regenerator 10 which is divided into a sealing section and a burning section, through which the catalyst flows in series. An inert seal gas is introduced into the sealing section through line 11. In the burning section, a free-oxygen containing gas, for example air, is introduced into the catalyst mass through line 12 and suitable distributing means. The air travels upwardly and downwardly in contact with the descending catalyst and burns the carbonaceous contaminants therefrom. Flue gases are disengaged from the catalyst bed and leave the regenerator through lines 7 and 13.

The catalyst, which by combustion of carbonaceous deposits in the regenerator 10 has been revivified for re-use in the reaction stage, now flows by gravity as a compact mass through line 14 into gas-lift vessel 15, wherein the catalyst is introduced into a stream of transporting gas entering through line 16. The gas carries the catalyst upwardly through gas-solids conduit 19 into intermediate separator 20. In the latter, the transporting gas separates from the catalyst and may be withdrawn from the separator through line 21. The catalyst settles to the bottom of separator 20 and flows therefrom as a compact mass through line 22 into a second gas-lift vessel 23, wherein the catalyst is introduced into a second stream of transporting gas entering through line 24. This second gas stream is at higher pressure than that which was introduced into gas-lift vessel 15 through line 16. The second stream of transporting gas carries the catalyst upwardly through gas-solids conduit 25 into separator 1, wherein the transporting gas separates from the catalyst and may be withdrawn through line 26.

The level of catalyst in intermediate separator 20 is maintained substantially constant by the operation of automatic level control 28, which automatically reduces or increases the rate of introduction of transporting gas through line 24 to compensate for a fall or a rise, respectively, in the catalyst level. When the level in intermediate separator 20 is thus controlled, the level of catalyst in separator 1 becomes a measure of the total amount of catalyst in the system; and when catalyst loss or removal from the system causes the catalyst surface in separator 1 to fall to a predetermined level, fresh catalyst is added to the system through line 29 from hopper 31 to bring the catalyst surface in separator 1 up to the proper level. Without level control 28, however, the level in separator 1 is not as accurate a measure of the total catalyst in the system, because that level then changes with variations in the level in intermediate separator 20.

It will be noted that, in order to maintain pressure differences between various parts of the system shown in Figure 1, sufficient vertical heights of catalyst in the seal legs between those parts must be maintained to balance those pressure differences. Thus, the height of the catalyst column in seal leg line 2 must be great enough to balance any excess in pressure that may exist in the sealing section of reactor 3 over the pressure in separator 1. Also, the height of the catalyst column in line 9 must be great enough to balance any excess in pressure in the sealing section of regenerator 10 over the pressure at the bottom of reactor 3. The excesses of transporting gas pressures over the pressures at the regenerator outlet and in intermediate separator 20 must be balanced by sufficient heights of catalyst in the lines 14 and 22 upstream from the gas-lift vessels 15 and 23 respectively. And finally, the height of the catalyst column in line 29 must be great enough to balance the excess in pressure in gas lift vessel 15 over the atmospheric pressure prevailing in hopper 31.

It is generally advantageous, in a system like that illustrated in Figure 1, to operate the reactor at an elevated pressure, e. g. about 10 lb./sq. in. gauge, in order that the cracked vapors will have sufficient pressure to carry them without further compression through the subsequent fractionation operations. Thus, in typical operation of a concurrent type reactor, the pressure in the sealing zone is about 10 lb./sq. in. gauge, and the pressure at the reactor outlet about 7 lb./sq. in. gauge.

Given the above conditions, separator 1 may be operated at atmospheric pressure, but it is preferred that it be operated at superatmospheric pressure, in order to minimize the required height of the catalyst column in line 2. It is further preferred that the pressure in separator 1 not exceed the pressure in the sealing section of reactor 3, in order to prevent transporting gas from entering reactor 3 with the regenerated catalyst. Higher separator pressures may be used, however, in the event that the transporting gas is of such nature that it does no harm in the reactor, e. g. when steam is used, or in the event that, if the transporting gas would do harm in the reactor, a harmless sealing gas, e. g. steam, is introduced into line 2 through line 27 at a pressure higher than the pressure in separator 1.

Whatever the pressure in separator 1, the pressure of the transporting gas in gas lift vessel 23 must be sufficiently higher than the pressure in separator 1 to overcome the pressure drop encountered in gas-solids conduit 25. That pressure drop varies with the size of the catalyst particles, the size of gas-solids conduit 25, and the rates of flow of catalyst and transporting gas.

Intermediate separator 20 may be operated at atmospheric pressure, but it is preferred that it be operated at superatmospheric pressure, in order to minimize the required height of the catalyst column in line 22. It is further preferred that the pressure in intermediate separator 20 not exceed the pressure at the regenerator outlet; otherwise, the pressure of the transporting gas in gas lift vessel 15 would have to be substantially higher than the regenerator outlet pressure, with the result that the height of the catalyst column in line 14 would have to be greater than the minimum obtainable according to the invention. It is important to minimize the height of line 14, because the heights, above the bottom of the system, of separator 1, reactor 3, and regenerator 7, all depend directly on the height of line 14.

Since it is preferred that the intermediate separator be operated at elevated pressure not exceeding the regenerator outlet pressure, it follows that the latter pressure is preferably superatmospheric. Another reason for operating regenerator 10 at elevated pressure is to prevent gases from the reactor from entering the regenerator with the catalyst introduced through line 9. In typical operation of a regenerator like that shown in Figure 1, the pressures in the regenerator sealing zone and at the regenerator outlet are both about 7 lb./sq. in. gauge, with oxygen-containing gas entering intermediately at higher pressure.

The following example, in which pressures are expressed in pounds per square inch gauge, illustrates how pressures may be balanced in a system like that shown in Figure 1.

*Example I*

Cracking catalyst particles are circulated continuously through a system of apparatus like that shown in Figure 1. In the gas-solids conduits, the particles are carried upward by a stream of transporting gas; elsewhere in the system, the particles move downwardly by gravity as a compact mass. In each of the gas-solids conduits 19 and 25, it is advisable to allow for one lb./sq. in. pressure drop in each twenty feet of the gas-solids conduit. This provides a proper margin of excess pressure, which may be dissipated by limited venting of transporting gas from separators 1 and 20. In each of the seal leg lines 2, 9, 14 and 22, the allowable pressure drop is about 0.2 lb./sq. in. per foot of vertical height of the catalyst columns therein; that is, for each lb./sq. in. that the lower terminal of the seal leg exceeds in pressure the upper terminal thereof, five feet of catalyst column height are required in order to allow the catalyst to flow at the required rate through those seal legs. It is to be noted that the allowable pressure drops given above will vary widely from one system to another, the values depending on a plurality of factors previously named.

The pressure in the reactor sealing section is ten; at the reactor outlet seven. The pressures in the regenerator sealing section and at the regenerator outlet are also seven. September 1 is maintained at a pressure of about eight and is situated about ten feet above reactor 3 in order to provide a ten foot height of catalyst column in line 2 to balance the two pound pressure difference between separator 1 and the reactor sealing section.

Transporting gas is introduced into gas lift vessel 23 to maintain a pressure therein of about sixteen; this allows for an eight pound pressure drop in gas-solids conduit 25, which is about 160 feet high. Intermediate separator 20 is maintained at a pressure of about six; it is situated about fifty feet above gas lift vessel 23, in order to provide sufficient height of catalyst column in line 22. Transporting gas is introduced into gas lift vessel 15 to maintain a pressure therein of slightly above eight; this allows for a slightly greater than two pound pressure drop in gas-solids conduit 19, which is about fifty feet high. Hopper 31 at atmospheric pressure is situated more than forty feet above gas lift vessel 15, in order to provide sufficient height of catalyst column in line 29.

Since the regenerator outlet pressure is about seven, the height of catalyst column in line 14 need only be slightly greater than five feet. In practical operation, this much height would be provided anyway, even if the regenerator outlet pressure were equal to the pressure in gas lift vessel 15.

It is noted that, if only a single gas lift were used, the bottom of the regenerator, where the pressure is seven, would have to be forty-five feet above the gas lift vessel, where the pressure is sixteen. Then separator 1, reactor 3, and regenerator 10 would each have to be almost forty feet higher above the bottom of the system than in the above example illustrating the invention.

In Figure 2, there are shown a regenerated catalyst separator 51, a reactor 53, a gas-lift vessel 60, a contaminated catalyst separator 63, solids conduits 52 and 59 connecting regenerated catalyst separator 51, reactor 53, and gas-lift vessel 60 in series, and a gas-solids conduit 62 connecting gas-lift vessel 60 and contaminated catalyst separator 63; a regenerator 66, two gas-lift vessels 71 and 79, an intermediate catalyst separator 76 between the gas-lift vessels 71 and 79, solids conduits 65 and 70 connecting contaminated catalyst separator 63, regenerator 66, and gas-lift vessel 71 in series, a gas-solids conduit 75 connecting gas-lift vessel 71 and intermediate separator 76, a solids conduit 78 connecting intermediate separator 76 and gas-lift vessel 79, and a gas-solids conduit 81 completing the cyclic system by connecting gas-lift vessel 79 and regenerated catalyst separator 51. Also shown is an automatic level control device 86 of any known type, actuated by level responsive element 83 in intermediate separator 76 and responding by varying the operation of gas lift vessel 79. A hopper 85 is connected to gas lift vessel 71 by line 84.

In operation, subdivided catalyst flows by gravity as a compact mass from regenerated catalyst separator 51 through line 52 into the top of reactor 53. Steam may be introduced into line 52 through line 74. In the reactor, catalyst contacts inert seal gas, hydrocarbon oil, and purge gas in successive zones, as in the operation previously described in connection with Fig. 1.

The contaminated catalyst flows by gravity as a compact mass through line 59 into gas-lift vessel 60, wherein the catalyst is introduced into a stream of transporting gas entering through line 61. The gas carries the catalyst upwardly through gas-solids conduit 62 into contaminated catalyst separator 63. In the latter, the transporting gas separates from the catalyst and may be withdrawn from separator 63 through line 64. The catalyst settles to the bottom of separator 63 and flows therefrom as a compact mass through line 65 into the top of regenerator 66. Steam may be introduced into line 65 through line 57. The catalyst contacts inert seal gas and oxygen-containing gas in successive zones, as in the operation previously described in connection with Figure 1.

The catalyst, which by combustion of carbonaceous deposits in the regenerator 66 has been revivified for re-use in the reaction stage, now flows by gravity as a compact mass through line 70 into gas lift vessel 71, wherein the catalyst is introduced into a stream of transporting gas entering through line 72. The gas carries the catalyst upwardly through gas-solids conduit 75 into intermediate separator 76. In the latter, the transporting gas separates from the catalyst and may be withdrawn from the separator through line 77. The catalyst settles to the bottom of separator 76 and flows therefrom as a compact mass through line 78 into gas-lift vessel 79, wherein the catalyst is introduced into a stream of transporting gas entering through line 80. This gas stream is at higher pressure than that which was introduced into gas-lift vessel 71 through line 72. The stream of transporting gas carries the catalyst upwardly through gas-solids conduit 81 into separator 51 wherein the transporting gas separates from the catalyst and may be withdrawn through line 82. The level of catalyst in intermediate separator 76 is maintained substantially constant by the operation of automatic level control 86. When the catalyst surface in separator 63 falls to a predetermined level, fresh catalyst is added to the system through line 84 from hopper 85.

It is generally advantageous, in a system like that shown in Figure 2, to maintain the reactor sealing section at about 10 lb./sq. in. gauge and the reactor outlet pressure at about 7 lb./sq. in. gauge, for the same reasons discussed with regard to Figure 1.

When, as shown in Figure 2, the reactor and regenerator are situated on substantially the same level, with elevation of the catalyst from the bottom of the reactor to the top of the regenerator, the regenerator is generally maintained at low pressure relative to the reactor, because there is no advantage to be derived from operation at any higher pressure. In typical operation, the pressures in the regenerator sealing zone and at the regenerator outlet are both about 1 lb./sq. in. gauge, with oxygen-containing gas entering intermediately at a higher pressure.

Given the above set of conditions, the intermediate separator 76 should be operated at atmospheric pressure; otherwise the pressure of the transporting gas in gas lift vessel 71 would have to be substantially higher than the regenerator outlet pressure, with the result that the height of the catalyst column in line 70 would have to be greater than the minimum obtainable.

The height of intermediate separator 76 above gas lift vessel 79, depends on the transporting gas pressure in gas lift vessel 79, which depends in turn primarily on the pressure in regenerated catalyst separator 51. Thus, the lower the latter pressure, the less may be the height of intermediate separator 76 above gas lift vessel 71. However, the lower the pressure in regenerated catalyst separator 51, the greater must be the height of regenerated catalyst separator 51 above reactor 53. Therefore the required heights of separators 51 and 76 are interdependent, and it is optional whether regenerated catalyst separator 51 is operated at atmospheric or elevated pressure. Atmospheric pressure has the advantage, however, that it allows a lesser required height of catalyst column in line 70, for reasons given subsequently in Example II. It is further preferred that the pressure in separator 51 not exceed the pressure in the sealing section of reactor 53, for the reasons given with regard to Figure 1.

It is preferred that contaminated catalyst separator 63 be operated at substantially atmospheric pressure, in order to prevent transporting gas from entering regenerator 66 with the contaminated catalyst. Superatmospheric pressures may be used, however, if the transporting gas does no harm in the regenerator, or if a harmless sealing gas is introduced into line 65 through line 57 at a pressure higher than the pressure in separator 63.

The pressure of the transporting gas in gas lift vessel 60 must be sufficiently higher than the pressure in separator 63 to overcome the pressure drop in gas-solids conduit 62. If separator 63 is at atmospheric pressure, the minimum required transporting gas pressure may be less than the reactor outlet pressure, in which case it is generally desirable to use transporting gas pressure higher than the minimum required, in order to prevent gases from the reactor from entering gas lift vessel 60 with the contaminated catalyst. However, the minimum pressure may be used in some instances, because there is sometimes no harm in allowing controlled amounts of gases from the reactor to enter gas lift vessel 60.

The following example, in which pressures are expressed in pounds per square inch gauge, illustrates how pressures may be balanced in a system like that shown in Figure 2.

*Example II*

Cracking catalyst particles are circulated continuously through a system of apparatus like that shown in Figure 2. The pressure drops allowed for in the gas-solids conduits and in the seal leg lines are 0.05 and 0.2 lb./sq. in. per foot, as in Example I. The pressure in the reactor sealing section is ten; at the reactor outlet seven. The pressures in the regenerator sealing section and at the regenerator outlet are one.

Contaminated catalyst separator 63 is maintained at atmospheric pressure; it is situated about five feet above regenerator 66, in order to provide sufficient height of catalyst column in line 65. Transporting gas is introduced into gas lift vessel 60 to maintain a pressure therein of about seven. Only four pounds would be required to allow a four pound pressure drop in gas-solids conduit 62, which is about eighty feet high; the excess pressure is dissipated by removing the transporting gas through line 64.

Regenerated catalyst separator 51 is maintained at atmospheric pressure and is situated about fifty feet above reactor 53 in order to provide sufficient height of catalyst column in line 52. Transporting gas is introduced into gas lift vessel 79 to maintain a pressure therein of about five; this allows for a slightly greater than four pound pressure drop in gas-solids conduit 81, which is about ninety feet high. Intermediate separator 76 is maintained at atmospheric pressure; it is situated about twenty-five feet above gas lift vessel 79, in order to provide sufficient height of catalyst column in line 78. Transporting gas is introduced into gas lift vessel 71 to maintain a pressure therein slightly above one; this allows for a slightly greater than one pound pressure drop in gas-solids conduit 75; which is about twenty-five feet high.

Since the regenerator outlet pressure is about one, the height of catalyst column in line 70 can be less than five feet. If only a single stage gas lift were used to elevate catalyst from the bottom of the regenerator to the top of the reactor, the bottom of the regenerator, where the pressure is one, would have to be twenty feet above the gas lift vessel, where the pressure is five. Then separator 63 and regenerator 66 would each have to be more than fifteen feet higher above the ground than in the above example illustrating the invention.

It is noted that if, in the above example, separator 51 were maintained at a pressure of eight, then its height above reactor 53 could be reduced to about ten feet. Gas-solids conduit 81 would then be only about fifty feet high, and the transporting gas pressure in gas lift vessel 79 would be slightly above ten. Intermediate separator 76 at atmospheric pressure would have to be about sixty feet above gas lift vessel 79; this additional height would require the transporting gas pressure in gas lift vessel 71 to be about three. The regenerator outlet pressure being one, the height of catalyst column in line 70 would have to be about ten feet, i. e. more than in the above example. However, in practical operation, this much height would probably be provided anyway, even if the regenerator outlet pressure were equal to the pressure in gas lift vessel 71.

Although, in Figures 1 and 2, two-stage gas-lifts have been shown for elevation of regenerated catalyst, it is to be understood that, when conditions warrant, gas-lift systems comprising more than two stages may be used. Each of the separators employed in the foregoing embodiments of the invention is provided with venting means for withdrawing transporting gas therefrom, and in operation the transporting gas is withdrawn thereby at a rate sufficient to maintain the desired pressure within the separator. If the separator is to be maintained at atmospheric pressure, substantially all of the transporting gas is withdrawn; if at superatmospheric pressure, none or a limited amount of the transporting gas is withdrawn.

The transporting gas used in the gas lifts of the invention may be of any of a variety of gases, e. g. air, flue gas, or steam. In some cases, it may be advantageous to use compressed air from the same source as the regenerating gas. In other cases, it may be desirable to use waste low-pressure steam, or flue gas obtained from the regeneration operation and compressed, if necessary, by any suitable known means.

Of the two embodiments of the invention illustrated in Figures 1 and 2, the embodiment shown in Figure 1 has an advantage in its relative simplicity of apparatus.

I claim:

1. Apparatus for transporting subdivided solids from a lower zone to a higher zone which comprises: a plurality of gas-lift units in series, each comprising a downwardly extending solids conduit providing a seal leg, a gas-lift housing communicating with the lower end of said solids conduit, a gas-solids conduit communicating with and extending upwardly from said housing, means for introducing lifting gas into said housing, said housing being closed to the atmosphere in order that superatmospheric pressure can be maintained therein, and all but the last of said gas-lift units also comprising a separating vessel communicating with the upper end of the gas-solids conduit of the same gas-lift unit; each solids conduit having open upper and lower ends and being otherwise closed, and having relatively constricted cross section throughout its entire length; the gas-solids conduit of the last of the gas-lift units communicating at its upper end with said higher zone; the upper end of the solids conduit of the first gas-lift unit communicating with said lower zone; and the upper end of the solids conduit of each of the other gas-lift units communicating with the separating vessel of the preceding gas-lift unit, thereby to form a single continuous solids path from said lower zone to said higher zone.

2. Apparatus according to claim 1 wherein the separating vessels are positioned at a higher level the nearer they are to said higher zone in the solids path from said lower zone to said higher zone.

3. Apparatus according to claim 1 wherein said apparatus comprises a hydrocarbon oil conversion vessel and a solids regeneration vessel and means for transporting subdivided solids from said higher zone through said conversion vessel and said regeneration vessel to said lower zone.

4. Apparatus according to claim 1 wherein said gas lift units are two in number.

5. Apparatus according to claim 1 wherein the levels of communication of the gas-lift housing with the solids conduits are approximately the same in all of the gas lift units.

6. The method for circulating subdivided solids through a system comprising a lower zone situated at the lower end of a relatively expanded zone within said system to a higher zone which comprises: passing said solids downwardly as a compact stream having relatively constricted cross section throughout its entire length and providing a seal leg from said lower zone directly into the first of at least two gas-lift zones; introducing said solids into a stream of gas under pressure in said first gas-lift zone; elevating said solids by said stream of gas to the first of at least one gas-solids separating zones; separating said solids from said stream of gas in said first separating zone; progressively passing solids downwardly as a compact stream having relatively constricted cross-section throughout its entire length and providing a seal leg from each separating zone directly into the next gas-lift zone; introducing solids into streams of gas under progressively increasing pressures in each gas-lift zone; progressively elevating solids by said streams of gas from each gas-lift zone other than the last to the next separating zone; separating solids from gas in each separating zone; elevating solids by a stream of gas from the last gas-lift zone to said higher zone; and continuously transporting solids, in operations additional to those previously recited, from said higher zone to said expanded zone.

7. Method according to claim 6 wherein the separating zones are positioned at a higher level the nearer they are to said higher zone in the solids path from said lower zone to said higher zone.

8. Method according to claim 6 wherein subdivided solids are circulated from said higher zone through a hydrocarbon oil conversion zone and a solids regeneration zone to said lower zone.

9. Method according to claim 6 wherein said gas lift zones are two in number.

10. Method according to claim 6 wherein said gas lift zones are all on substantially the same level.

11. Apparatus for circulation of granular solids which comprises: a hydrocarbon conversion vessel; positioned therebeneath a solids regeneration vessel; a solids conduit extending downwardly from a lower portion of said hydrocarbon conversion vessel to an upper portion of said regeneration vessel and providing a seal leg; a second solids conduit extending downwardly from a lower portion of said regeneration vessel and providing a seal leg; a gas-lift housing communicating with the lower end of said second solids conduit and closed to the atmosphere in order that superatmospheric pressure can be maintained therein; means for introducing lifting-gas into said housing; a gas-solids conduit communicating with said housing and extending upwardly therefrom; a gas-solids separating vessel communicating with the upper end of said gas-solids conduit; a third solids conduit providing a solids path separate from the solids path through said conversion vessel and through said regeneration vessel, said third solids conduit extending downwardly from said separating vessel and providing a seal leg; a second gas-lift housing communicating with the lower end of said third solids conduit and closed to the atmosphere in order that superatmospheric pressure can be maintained therein; means for introducing lifting gas into said second gas-lift housing; a second gas-solids conduit communicating with said second housing and extending upwardly therefrom; a second gas-solids separating vessel communicating with the upper end of said second gas-solids conduit and positioned above the first-named separating vessel; and a solids conduit extending downwardly from said second gas-solids separating vessel to an upper portion of said hydrocarbon conversion vessel; each solids conduit having open upper and lower ends and being otherwise closed, and having relatively constricted cross section throughout its entire length.

12. Apparatus for circulation of granular solids which comprises: a hydrocarbon conversion vessel; a solids conduit extending downwardly from a lower portion thereof and providing a seal leg; a gas-lift housing communicating with the lower end of said solids conduit and closed to the atmosphere in order that superatmospheric pressure can be maintained therein; means for introducing lifting gas into said housing; a gas-solids conduit communicating with said housing and extending upwardly therefrom; a gas-solids separating vessel communicating with the upper end of said gas-solids conduit; a solids regeneration vessel; a second solids conduit extending downwardly from said separating vessel to an upper portion of said solids regeneration vessel and providing a seal leg; a third solids conduit extending downwardly from a lower portion of said regeneration vessel and providing a seal leg; a second gas-lift housing communicating with the lower end of said third solids conduit and closed to the atmosphere in order that superatmospheric pressure can be maintained therein; means for introducing lifting gas into said second gas-lift housing; a second gas-solids conduit communicating with said second housing and extending upwardly therefrom; a second gas-solids separating vessel communicating with the upper end of said second gas-solids conduit; a fourth solids conduit providing a solids path separate from the solids path through said conversion vessel and through said regeneration vessel, said fourth solids conduit extending downwardly from said second gas-solids separating vessel and providing a seal leg; a third gas-lift housing communicating with the lower end of said fourth solids conduit and closed to the atmosphere in order that superatmospheric pressure can be maintained therein; means for introducing lifting gas into said third gas-lift housing; a third gas-solids conduit communicating with said third gas-lift housing and extending upwardly therefrom; a third gas-solids separating vessel communicating with the upper end of said third gas-solids conduit; and a fifth solids conduit extending downwardly from said third gas-solids separating vessel to an upper portion of said hydrocarbon conversion vessel and providing a seal leg; each solids conduit having open upper and lower ends and being otherwise closed, and having relatively constricted cross section throughout its entire length.

13. Method for circulation of granular solids which comprises: gravitating such solids through a relatively expanded hydrocarbon conversion zone; gravitating solids from said conversion zone as a relatively constricted stream providing a seal leg into a relatively expanded solids regeneration zone; gravitating solids through said regeneration zone; gravitating solids as a stream having relatively constricted cross section throughout its entire length and providing a seal leg from said regeneration zone directly into a gas-lift zone; introducing solids into a stream of gas under pressure in said gas-lift zone; elevating solids by said stream of gas; separating the elevated solids from gas in a separating zone; gravitating the separated solids, before re-introduction into said conversion zone or into said regeneration zone, as a compact stream having relatively constricted cross section throughout its entire length and providing a second seal leg from said separating zone directly into a second gas-lift zone; introducing solids into a second stream of gas under pressure in said second gas-lift zone; elevating solids by said second stream of gas; separating the solids thus elevated from gas in a second separating zone above the first-named separating zone; and gravitating the separated solids from said second separating zone to an upper portion of said conversion zone.

14. Method for circulation of granular solids which comprises: gravitating such solids through a relatively expanded hydrocarbon conversion zone; gravitating solids as a relatively constricted compact stream providing a seal leg from said conversion zone into a gas-lift zone; introducing solids into a stream of gas under pressure in said gas-lift zone; elevating solids by said stream of gas; separating the elevated solids from gas in a separating zone; gravitating the separated solids, as a compact stream providing a seal leg from said separating zone into a relatively expanded solids regeneration zone; gravitating solids through said regeneration zone; gravitating solids as a compact stream having relatively constricted cross section throughout its entire length and providing a seal leg from said regeneration zone directly into a second gas-lift zone; introducing solids into a second stream of gas under pressure in said second gas-lift zone; elevating solids by said second stream of gas; separating the solids thus elevated from gas in a second separating zone; gravitating the separated solids, before reintroduction into said conversion zone or said regeneration zone, as a compact stream having relatively constricted cross section throughout its entire length and providing a seal leg from said second separating zone directly into a third gas-lift zone; introducing solids into a third stream of gas in said third gas-lift zone; elevating solids by said third stream of gas; separating solids thus elevated from gas in a third separating zone;

and gravitating solids as a compact stream providing a seal leg from said third separating zone to said conversion zone.

RAYMOND C. LASSIAT.

References Cited in the file of this patent

UNITED STATES PATENTS

| Number | Name | Date |
|---|---|---|
| 2,377,512 | Page | June 5, 1945 |
| 2,429,359 | Kassel | Oct. 21, 1947 |
| 2,463,623 | Huff | Mar. 8, 1949 |
| 2,509,983 | Morrow | May 30, 1950 |
| 2,545,162 | Muly et al. | Mar. 13, 1951 |
| 2,561,771 | Ardern | July 24, 1951 |
| 2,568,379 | Berg | Sept. 18, 1951 |

OTHER REFERENCES

"Oil and Gas Journal," vol. 47, January 13, 1949, pages 78 and 79.